(12) United States Patent
Ehinger et al.

(10) Patent No.: US 11,434,967 B2
(45) Date of Patent: Sep. 6, 2022

(54) PRESSURE BUFFER STOP FOR A VIBRATION DAMPER

(71) Applicants: THYSSENKRUPP BILSTEIN GMBH, Ennepetal (DE); thyssenkrupp AG, Essen (DE)

(72) Inventors: Alexander Ehinger, Ditzingen (DE); Amin Nezami, Remscheid (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 733 days.

(21) Appl. No.: 16/308,868

(22) PCT Filed: Jun. 22, 2017

(86) PCT No.: PCT/EP2017/065404
§ 371 (c)(1),
(2) Date: Dec. 11, 2018

(87) PCT Pub. No.: WO2018/001860
PCT Pub. Date: Jan. 4, 2018

(65) Prior Publication Data
US 2020/0309224 A1 Oct. 1, 2020

(30) Foreign Application Priority Data
Jun. 27, 2016 (DE) .................. 10 2016 211 531.6

(51) Int. Cl.
*F16F 1/376* (2006.01)
*F16F 13/06* (2006.01)
(Continued)

(52) U.S. Cl.
CPC ............ *F16F 1/376* (2013.01); *B60G 15/063* (2013.01); *B60G 15/066* (2013.01); *F16F 1/377* (2013.01);
(Continued)

(58) Field of Classification Search
CPC .......... F16F 1/376; F16F 1/3732; F16F 1/377; F16F 1/44; F16F 9/38; F16F 9/58;
(Continued)

(56) References Cited

U.S. PATENT DOCUMENTS 5,052,665 A * 10/1991 Sakuragi .............. B60G 15/068
267/220
5,308,104 A * 5/1994 Charles .................. B60G 11/52
267/220
(Continued)

FOREIGN PATENT DOCUMENTS

CN 101865240 A 10/2010
CN 102941802 A 2/2013
(Continued)

OTHER PUBLICATIONS

DIN 53571, "Testing of flexible cellular materials Tensile strength testing Determination of tensile strength and elongation at break", German Standard, DK 678.076-405.8 : 620.172, Jan. 1986.
(Continued)

*Primary Examiner* — Melody M Burch
(74) *Attorney, Agent, or Firm* — thyssenkrupp North America, LLC

(57) ABSTRACT

A pressure buffer stop for a vibration damper that comprises for being at least partially received in a dome bearing housing an outer contour and for coaxial arrangement on a piston rod of the vibration damper a hollow-cylindrical basic structure with an inner contour, wherein the outer contour of the pressure buffer stop comprises in at least one region for being at least partially received in the dome bearing housing a three-dimensionally structured surface.

18 Claims, 2 Drawing Sheets

(51) Int. Cl.
*B60G 15/06* (2006.01)
*F16F 1/373* (2006.01)
*F16F 1/377* (2006.01)
*F16F 9/38* (2006.01)
*F16F 9/58* (2006.01)
*F16F 1/44* (2006.01)

(52) U.S. Cl.
CPC ............ *F16F 1/3732* (2013.01); *F16F 9/38* (2013.01); *F16F 9/58* (2013.01); *F16F 13/06* (2013.01); *B60G 2202/31* (2013.01); *B60G 2204/125* (2013.01); *B60G 2204/4502* (2013.01); *B60G 2206/42* (2013.01); *B60G 2800/162* (2013.01); *F16F 1/44* (2013.01); *F16F 2230/0005* (2013.01); *F16F 2230/007* (2013.01); *F16F 2230/0023* (2013.01); *F16F 2230/0035* (2013.01); *F16F 2230/02* (2013.01); *F16F 2230/10* (2013.01); *F16F 2232/08* (2013.01); *F16F 2236/04* (2013.01)

(58) Field of Classification Search
CPC .... F16F 13/06; F16F 2232/08; F16F 2236/04; F16F 2230/0005; F16F 2230/0041; F16F 2230/36; F16F 2230/0023; F16F 2230/0035; F16F 2230/007; F16F 2230/02; F16F 2230/10; B60G 15/066; B60G 15/063; B60G 2202/31; B60G 2204/125; B60G 2204/4502; B60G 2206/42; B60G 2800/162
See application file for complete search history.

(56) References Cited

U.S. PATENT DOCUMENTS

| | | | |
|---|---|---|---|
| 6,296,237 B1 | 10/2001 | Nagai | |
| 2002/0021655 A1 | 2/2002 | Shin | |
| 2005/0284868 A1 | 12/2005 | Ko | |
| 2009/0127043 A1 | 5/2009 | Dickson | |
| 2010/0025903 A1* | 2/2010 | Thye-Moormann | F16F 1/3732 267/153 |
| 2011/0133380 A1* | 6/2011 | Harden | F16F 1/376 267/292 |
| 2012/0292842 A1* | 11/2012 | Van Der Zyppe | F16F 9/58 267/292 |
| 2013/0220751 A1* | 8/2013 | Seo | F16F 9/36 188/322.17 |
| 2013/0249184 A1* | 9/2013 | Munchel | B60G 11/28 280/124.158 |
| 2017/0240015 A1* | 8/2017 | Im | F16F 1/377 |

FOREIGN PATENT DOCUMENTS

| | | |
|---|---|---|
| DE | 40 29 490 A1 | 3/1992 |
| DE | 43 36 034 A1 | 4/1995 |
| DE | 20210603 U | 12/2002 |
| DE | 102005029996 A | 1/2006 |
| DE | 102014206756 A | 10/2015 |
| EP | 0480649 A | 4/1992 |
| EP | 2251218 A | 11/2010 |

OTHER PUBLICATIONS

DIN 53420, "Testing of Cellular Materials—Determination of Apparent Density", UDC [678.4/.8)-405.8: 620.1: 531.755.1, Dec. 1978.
DIN 53515, "Determination of tear strength of rubber, elastomers and plastic film using Graves angle test piece with nick", UDC 678.074: 620.178.245, Jan. 1990.
English Translation of International Search Report issued in PCT/EP2017/065404, dated Sep. 19, 2017.

* cited by examiner

PRESSURE BUFFER STOP FOR A VIBRATION DAMPER

CROSS REFERENCE TO RELATED APPLICATIONS

This application is a U.S. National Stage Entry of International Patent Application Serial Number PCT/EP2017/065404, filed Jun. 22, 2017, which claims priority to German Patent Application No. DE 10 2016 211 531.6, filed Jun. 27, 2016, the entire contents of both of which are incorporated herein by reference.

FIELD

The present disclosure generally relates to a pressure buffer stop for a vibration damper and a vibration damper having a pressure buffer stop.

BACKGROUND

A large number of embodiments of pressure buffer stops are known in the prior art. Pressure buffer stops, also known as pressure stops, are generally fitted to the piston rod of a vibration damper and are intended to limit the deflection path of vibration dampers without noise pollution. For example, noise emissions are also intended to be understood to include disruptive noises which can also be perceived in the inner space of motor vehicles. Often, the noise pollution can be attributed to relative movements between the pressure buffer stop and components of the vibration damper which are in contact with the pressure buffer stop. In particular, these may be relative movements between the piston rod and the pressure buffer stop which is arranged on the piston rod. In addition, the noise pollution may, for example, also be attributed to relative movements between a dome bearing, in particular a dome bearing receiving member, and the pressure buffer stop which is arranged therein. A main cause of the noise problem is considered to be the physical effect of stick-slip. This refers to the jerky sliding action of solid bodies which are moved with respect to each other.

DE 202 106 03 U1 discloses a hollow-cylindrical damping element as a pressure buffer stop.

Thus a need exists for improved pressure buffer stops in which the disadvantages mentioned in the prior art are addressed. In particular, with this improved pressure buffer stop an alternative solution to known pressure buffer stops is provided. In addition, the replacement of pressure buffer stops is intended to be possible in a safe, rapid and variable manner and consequently in particular occurrences of noise pollution are intended to be able to be rapidly overcome.

DETAILED DESCRIPTION

Figure 1:
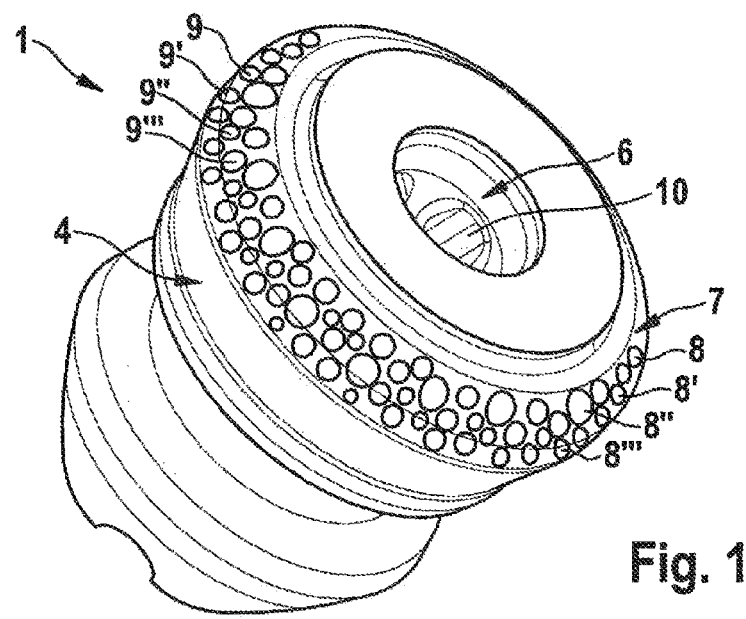
FIG. 1 is a schematic perspective view of a pressure buffer stop according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a pressure buffer stop for a vibration damper and a vibration damper having a pressure buffer stop.

The pressure buffer stop according to the invention comprises in comparison with conventional pressure buffer stops the advantage that the physical effect of the stick-slip can be influenced in a selective manner and consequently the noise emission can be reduced or overcome.

The invention therefore relates to a pressure buffer stop for a vibration damper, wherein the pressure buffer stop comprises for being at least partially received in a dome bearing housing an outer contour and for coaxial arrangement on a piston rod of the vibration damper a hollow-cylindrical basic structure with an inner contour, wherein the outer contour of the pressure buffer stop comprises in at least one region for being at least partial received in the dome bearing housing a three-dimensionally structured surface.

Another aspect of subject-matter of the invention is therefore a vibration damper for a vehicle comprising a damper pipe which is at least partially filled with damping fluid and in which a piston rod can be moved back and forth, wherein there can also be moved with the piston rod an operating piston, by means of which the inner space of the damper pipe is divided into a piston-rod-side operating space and an operating space remote from the piston rod, and a pressure buffer stop, wherein the pressure buffer stop is arranged on the piston rod and is constructed as a pressure buffer stop according to the invention.

The invention can be implemented both in the pressure buffer stop for a vibration damper and in a vibration damper for a vehicle.

In the context of the present invention, a three-dimensionally structured surface is intended to be understood to be a surface which extends in at least three dimensions, with respect to the construction plane of the pressure buffer stop. The construction plane corresponds to the so-called zero plane of a shaping tool for producing pressure buffer stops, wherein in the production process negative formations of the shaping tool form the projections with respect to the zero plane and positive formations of the shaping tool form the recesses with respect to the zero plane.

According to another embodiment of the invention, the outer contour comprises a three-dimensional topographic surface structure.

In another embodiment of the invention, the three-dimensionally structured surface comprises a plurality of projections and/or a plurality of recesses.

In the context of the present invention, projections and/or recesses relate to the construction plane of the pressure buffer stop.

According to another embodiment of the invention, the plurality of projections and/or recesses are at least partially distributed homogeneously, at least in the region for being at least partially received in the dome bearing housing.

The term "homogeneously distributed" is intended in the context of the present invention to be understood to be a uniform distribution. For example, a uniform distribution comprises a specific pattern of the structured surface.

According to another embodiment of the invention, the plurality of projections and/or recesses are at least partially distributed heterogeneously, at least in the region for being at least partially received in the dome bearing housing.

The term "heterogeneously distributed" is intended in the context of the present invention to refer to a non-uniform distribution. For example, a non-uniform distribution does not have any specific pattern of the structured surface.

The at least partially homogeneous and/or heterogeneous distribution may be arranged transversely and/or longitudinally with respect to the peripheral direction of the pressure buffer stop.

According to another embodiment of the invention, more than 25% of the plurality of recesses at least in the region for being at least partially received in the dome bearing housing are greater than or equal to 0.1 mm with respect to the zero plane of a shaping tool, by means of which the pressure buffer stop was produced.

In another embodiment of the invention, more than 5% of the plurality of projections at least in the region for being at least partially received in the dome bearing housing have a height in a range from 0.2 to 0.3 mm with respect to the zero plane of a shaping tool, by means of which the pressure buffer stop was produced.

According to another embodiment of the invention, less than 10% of the plurality of recesses at least in the region for being at least partially received in the dome bearing housing have a depth in a range from 0.1 to 0.2 mm with respect to the zero plane of a shaping tool, by means of which the pressure buffer stop was produced.

In another embodiment of the invention, less than 5% of the plurality of recesses at least in the region for being at least partially received in the dome bearing housing have a depth in a range from 0.2 to 0.3 mm with respect to the zero plane of a shaping tool, by means of which the pressure buffer stop was produced.

According to another embodiment of the invention, a plurality of clamping elements are arranged on the inner contour of the pressure buffer stop to form a clamping connection, wherein with the plurality of clamping elements a clamping connection can be formed on the piston rod between the piston rod and the pressure buffer stop with a coaxial arrangement of the pressure buffer stop. Examples of clamping elements are clamping cushions, clamping plates, clamping blocks and combinations thereof.

In another embodiment of the invention, the plurality of clamping elements have an at least partially helical geometric construction and are arranged on the inner contour of the pressure buffer stop in a helical manner.

According to another embodiment of the invention, the plurality of clamping elements are arranged in groups as clamping modules in the piston rod longitudinal direction on the inner contour of the pressure buffer stop.

In another embodiment of the invention, the plurality of clamping elements and/or clamping modules are arranged in opposing directions in a helical manner in the piston rod longitudinal direction on the inner contour of the pressure buffer stop.

In the context of the present invention, the term "opposing directions" is intended to be understood to mean that the pitch of the plurality of clamping elements and/or clamping modules is alternately inverted in a radial sequence, wherein the value of the pitch of the plurality of clamping elements and/or clamping modules remains constant.

According to another embodiment of the invention, the plurality of clamping elements and/or clamping modules comprise at least in a region for the coaxial arrangement on the piston rod a three-dimensionally structured surface.

According to another embodiment of the invention, the three-dimensionally structured surface of the plurality of clamping elements (10, 10', 10'', 10''') and/or clamping modules (11, 11', 11'') comprises a plurality of projections and/or a plurality of recesses.

In another embodiment of the invention, the basic structure of the pressure buffer stop comprises a base of polyisocyanate polyaddition products, preferably based on cellular polyurethane elastomers, which where applicable may contain polyurea structures, in a particularly preferred manner based on cellular polyurethane elastomers preferably with a density in accordance with DIN 53420 of from 200 to 1100 kg/m$^3$, preferably of from 300 to 800 kg/m$^3$, a tensile strength in accordance with DIN 53 571 of greater than or equal to 2 N/mm$^2$, preferably from 2 to 8 N/mm$^2$, an expansion in accordance with DIN 53571 of 300, preferably from 300 to 700%, and a tear propagation resistance in accordance with DIN 53515 of greater than or equal to 8 N/mm, preferably from 8 to 25 N/mm.

According to another embodiment of the invention, the basic structure of the pressure buffer stop comprises a base of a thermoplastic plastics material, Examples of thermoplastic plastics materials are all plastics materials which are suitable for being processed by means of injection-molding methods. Suitable thermoplastic plastics materials are both polycondensates and polymerisates, and polyadducts. Suitable thermoplastic polycondensates are polyamides, in particular such as 6,6-polyamide, polycarbonates, polyester, preferably polyterephthalates such as polyethylene terephthalate and polybutylene terephthalate, polyphenylene oxides, polysulfones and polyvinyl acetates. Suitable thermoplastic polymerisates are polyolefins, in particular polyethylene, polypropylene, poly-1-butene, poly(4-methyl-1-pentene), furthermore polyvinyl chloride, polyvinylidene chloride, poly(methyl methacrylate), polyacrylonitrile, polystyrene, shock-resistant polystyrene, polyacetals, polyvinyl alcohols, polyvinyl acetate, polyoxymethylene and poly(p-xylylene) or combinations thereof. Suitable thermoplastic polyadducts are in particular thermoplastic polyurethanes.

Other suitable thermoplastic plastics materials, in particular thermoplastic polymers, are styrene-acrylonitrile copolymerisates (SAN), a-methylstyrene-acrylonitrile copolymerisates, styrene-methacrylic acid methyl ester copolymerisates and styrene-maleic acid hydride copolymerisates and acrylonitrile-butadiene-styrene polymerisates (ABS), acrylonitrile-styrene-acrylester polymerisates (ASA), polyoxymethylene (POM), polyamide, polypropylene or combinations thereof.

Another aspect of subject-matter of the invention involves a vibration damper comprising
  a damper pipe which is at least partially filled with damping fluid and in which a piston rod can be moved back and forth, wherein there can also be moved with the piston rod an operating piston, by means of which the inner space of the damper pipe is divided into a piston-rod-side operating space and an operating space remote from the piston rod,
  at least one pressure buffer stop, wherein the at least one pressure buffer stop for being at least partially received in a dome bearing housing an outer contour and for coaxial arrangement on the piston rod of the vibration damper a hollow-cylindrical basic structure with an inner contour,
wherein the outer contour of the pressure buffer stop comprises in at least one region for being at least partially received in the dome bearing housing a three-dimensionally structured surface. The vibration damper may comprise further embodiments of the above-mentioned pressure buffer stop according to the invention.

FIG. 1 is a schematic oblique plan view of a pressure buffer stop 1 having a hollow-cylindrical basic structure comprising an outer contour 4 and an inner contour 6. The outer contour 4 comprises a three-dimensional (topographic) surface structure 7. The three-dimensional (topographic) surface structure 7 a plurality of projections (8, 8', 8", 8''') and/or a plurality of recesses (9, 9', 9", 9'''). The plurality of projections (8, 8', 8", 8''') and/or plurality of recesses (9, 9', 9", 9''') are distributed at least partially in a homogeneous manner. A plurality of clamping elements 10, 10', 10", 10''' are arranged on the inner contour 6 of the pressure buffer stop 1, wherein, for example, a clamping element 10 is illustrated.

Figure 2:
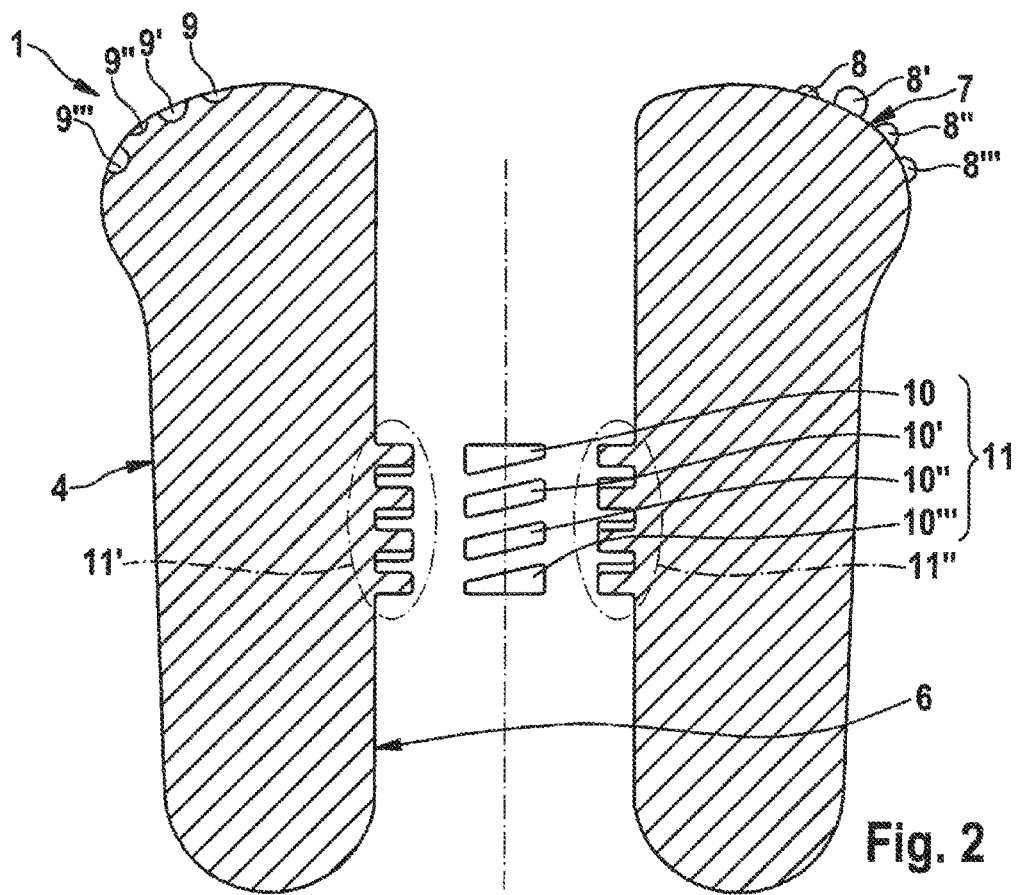
FIG. 2 is a schematic longitudinal sectional view of a pressure buffer stop according to FIG. 1 with clamping elements which are formed in the inner contour.

FIG. 2 is a schematic longitudinal section of the pressure buffer stop 1 according to FIG. 1 with the clamping elements 10, 10', 10", 10''' formed in the inner contour 6. The pressure buffer stop 1 comprises the outer contour 4 and the inner contour 6, wherein the clamping elements 10, 10', 10", 10''' of the inner contour 6 are illustrated arranged. The plurality of clamping elements 10, 10', 10", 10''' illustrated have a helical geometric configuration. In addition, the illustrated plurality of clamping elements 10, 10', 10", 10''' are illustrated in a state arranged in groups as clamping modules 11, 11', 11".

Figure 3:
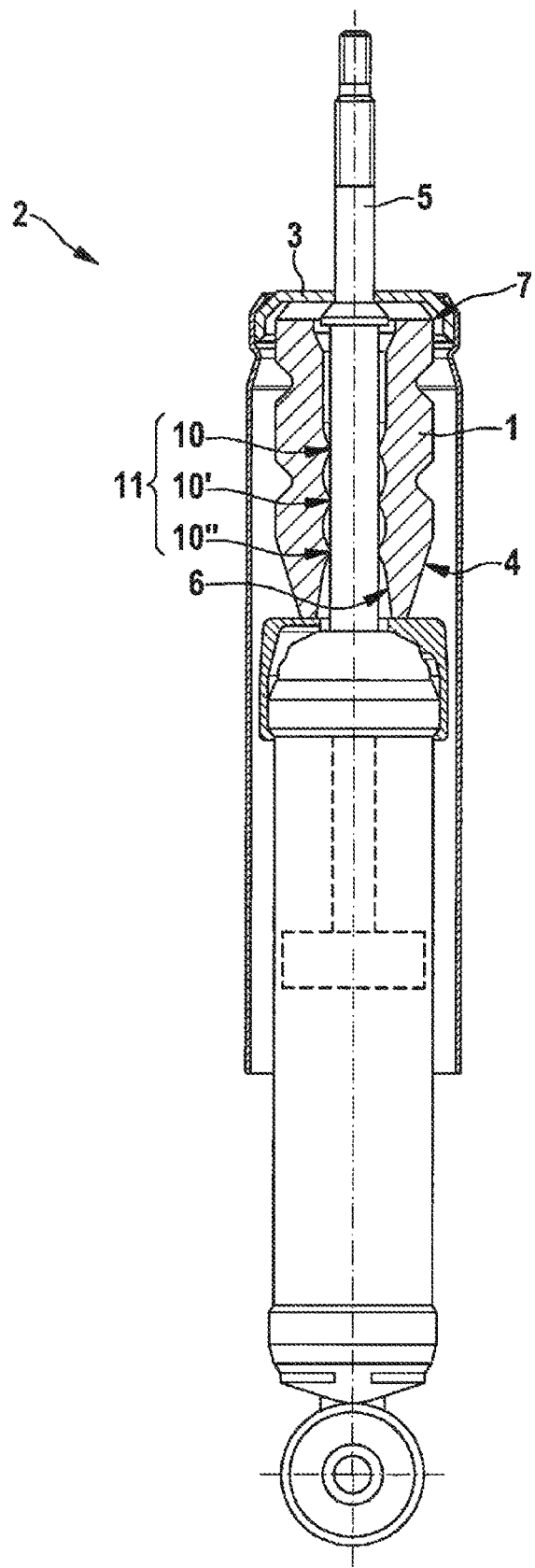
FIG. 3 is a schematic longitudinal sectional view of a vibration damper having a pressure buffer stop according to FIG. 2.

FIG. 3 is a schematic longitudinal section of a vibration damper 2 with the pressure buffer stop 1 according to FIG. 2. The pressure buffer stop 1 is arranged coaxially on a piston rod 5 of the vibration damper 2 and is received in a dome bearing housing 3. The three-dimensional (topographic) surface structure 7 is constructed in at least one region of the at least partial receiving member of the pressure buffer stop 1.

Exemplary pressure buffer stops according to the invention were produced using an injection-molding method. A cellular elastomer (PUR (NDI) Cellasto MH24-45) was used as a plastics material. Subsequently, the surface of the pressure buffer stop produced was scanned with a 3D scanner and evaluated. The three-dimensional (topographic) surface structure of the outer contour of the pressure buffer stop was detected with a 3D scanner and evaluated. An ATOS Core 135 with the ATOS Professional Software (V8 SR1) was used for the data acquisition as a sensor and the GOM Inspect Professional V8 SR1 from the company GOM, Gesellschaft für Optische Messtechnik mbH, Mittelweg 7-8, 38106 Braunschweig, Germany was used for evaluation.

Firstly, a reference face which corresponds to the zero plane of the shaping tool used and against which the surface comparison was carried out was constructed. To this end, where possible all the regions of the "smooth base face", that is to say, the zero plane for the portion to be analyzed, were selected and a triangulated polynomial surface (Construct Surface Triangulated polynomial surface) was constructed. In the software, 5 was selected for surface degree and "all" was selected for used locations as the parameters.

This surface was converted by means of Operations CAD Actual-Network in CAD into a CAD and with respect to this CAD a surface comparison was subsequently carried out.

The following Table 1 shows by way of example the evaluated data of a measurement series measured with the 3D scan in respect of the projections and recesses of the three-dimensional surface structure of the outer contour according to the invention of the pressure buffer stop.

TABLE 1

Projections and recesses measured with the 3D scan in respect of the three-dimensional surface structure of the outer contour according to the invention of the pressure buffer stop.

| Min [mm] | Max [mm] | Percentage [%] |
| --- | --- | --- |
| 0.3 | | 5 |
| 0.2 | 0.3 | 5 |
| 0.1 | 0.2 | 25 |
| −0.1 | 0.1 | 40 |
| −0.2 | −0.1 | 10 |
| −0.3 | −0.2 | 5 |
| | −0.3 | 5 |

The following Table 2 shows by way of example the evaluated data of a measurement series measured with the 3D scan in respect of the projections and recesses of the three-dimensional surface structure of the inner contour according to the invention of the pressure buffer stop.

TABLE 2

Projections and recesses measured with the 3D scan in respect of the three-dimensional surface structure of the inner contour according to the invention of a plurality of clamping elements of the pressure buffer stop.

| Min [mm] | Max [mm] | Percentage [%] |
| --- | --- | --- |
| 0.3 | | 5 |
| 0.2 | 0.3 | 5 |
| 0.1 | 0.2 | 25 |
| −0.1 | 0.1 | 40 |
| −0.2 | −0.1 | 10 |
| −0.3 | −0.2 | 5 |
| | −0.3 | 5 |

INDUSTRIAL APPLICABILITY

Pressure buffer stops of the type described above are used in the production of vibration dampers, in particular vibration dampers of motor vehicles.

LIST OF REFERENCE NUMERALS

1=Pressure buffer stop
2=Vibration damper
3=Dome bearing housing
4=Outer contour
5=Piston rod
6=Inner contour
7=Three-dimensional structured surface
8, 8', 8", 8'''=Projection(s)
9, 9', 9", 9'''=Recess(es)
10, 10', 10", 10'''=Clamping element(s)
11, 11', 11"=Clamping module(s)

What is claimed is:
1. A pressure buffer stop for a vibration damper, wherein the pressure buffer stop comprises:
an outer contour configured to be at least partially received in a dome bearing housing of the vibration damper, a hollow-cylindrical basic structure with an inner contour configured to arrange the pressure buffer stop coaxially on a piston rod of the vibration damper, wherein the outer contour of the pressure buffer stop comprises in at least one region configured to be at least partially received in the dome bearing housing a three-dimensionally structured surface, with the three-dimensionally structured surface being radially spaced apart from the inner contour that is configured to receive the piston rod, with the three-dimensionally structured surface comprising projections having a spherical contour, wherein the three-dimensionally structured surface is disposed on a convex portion of the outer contour between a radial outermost portion of the pressure buffer stop and a longitudinal end of the pressure buffer stop.

2. The pressure buffer stop of claim 1, wherein the three-dimensionally structured surface is a three-dimensional topographical surface structure.

3. The pressure buffer stop of claim 1, wherein the three-dimensionally structured surface comprises a plurality of recesses.

4. The pressure buffer stop of claim 3, wherein the projections and/or the plurality of recesses are at least partially distributed homogeneously, at least in the region.

5. The pressure buffer stop of claim 3, wherein the projections and/or the plurality of recesses are at least partially distributed heterogeneously, at least in the region.

6. The pressure buffer stop of claim 1, including a plurality of clamping elements arranged on the inner contour of the pressure buffer stop, the clamping elements sized and shaped to extend and connect to the piston rod to form a clamping connection between the piston rod and the pressure buffer stop and arrange the pressure buffer stop coaxially on the piston rod.

7. The pressure buffer stop of claim 6, wherein the plurality of clamping elements at least partially comprise a helical geometric construction and are arranged on the inner contour of the pressure buffer stop in a helical manner.

8. The pressure buffer stop of claim 6, wherein the plurality of clamping elements are arranged in groups as clamping modules in the piston rod longitudinal direction on the inner contour of the pressure buffer stop.

9. The pressure buffer stop of claim 8, wherein the plurality of clamping elements and/or clamping modules are arranged in opposing directions in a helical manner in the piston rod longitudinal direction on the inner contour of the pressure buffer stop.

10. The pressure buffer stop of claim 8, wherein the plurality of clamping elements and/or clamping modules comprise a three-dimensional structured surface at least in a region for the coaxial arrangement on the piston rod.

11. The pressure buffer stop of claim 10, wherein the three-dimensional structured surface of the plurality of clamping elements and/or clamping modules comprises a plurality of projections and/or a plurality of recesses.

12. A vibration damper for a vehicle, comprising: a damper pipe at least partially filled with damping fluid,
a piston rod movably disposed in the damper pipe, and
a piston operatively connected to the piston rod, the piston dividing an inner space of the damper pipe into a piston-rod-side operating space and an operating space remote from the piston rod, and the pressure buffer stop of claim 1 arranged on the piston rod.

13. The pressure buffer stop of claim 1 wherein the inner contour is coaxial with a longitudinal axis, wherein the projections of the three-dimensionally structured surface extend from a surface of the outer contour, wherein the outer contour extends farther in a first longitudinal direction along the longitudinal axis and farther in a second longitudinal direction along the longitudinal axis than any of the projections, with the first and second longitudinal directions being opposite one another.

14. The pressure buffer stop of claim 1 wherein the inner contour is coaxial with a longitudinal axis, wherein the longitudinal axis is perpendicular to a radial plane, wherein the projections of the three-dimensionally structure surface extend from the outer contour at angles that are transverse to the longitudinal axis and the radial plane, wherein the projections are configured to mate with the dome bearing housing of the vibration damper.

15. A pressure buffer stop for a vibration damper, wherein the pressure buffer stop comprises:
an outer contour configured to be at least partially received in a dome bearing housing of the vibration damper,
a hollow-cylindrical basic structure with an inner contour configured to arrange the pressure buffer stop coaxially on a piston rod of the vibration damper,
wherein the outer contour of the pressure buffer stop comprises in at least one region configured to be at least partially received in the dome bearing housing a three-dimensionally structured surface, with the three-dimensionally structured surface comprising projections having a spherical contour,
wherein the three-dimensionally structured surface is disposed on a convex portion of the outer contour between a radial outermost portion of the pressure buffer stop and a longitudinal end of the pressure buffer stop, with the three-dimensionally structured surface being spaced apart from the inner contour.

16. The pressure buffer stop of claim 15 wherein the spherical contour of a first of the projections has a diameter that is larger than the spherical contour of a second of the projections.

17. The pressure buffer stop of claim 15 wherein the three-dimensionally structured surface comprises recesses having a spherical contour.

18. The pressure buffer stop of claim 17 wherein the spherical contour of a first of the recesses has a diameter that is larger than the spherical contour of a second of the recesses.

* * * * *